United States Patent
Boschis et al.

(10) Patent No.: US 6,201,910 B1
(45) Date of Patent: Mar. 13, 2001

(54) FIBRE BRAGG GRATING WITH OFFSET EQUIVALENT MIRROR PLANE AND METHOD FOR ITS MANUFACTURE

(75) Inventors: Laura Boschis, Almese; Angelantonio Gnazzo, Alessandria; Oriana Rossotto, Almese; Luigi Tallone, Paesana, all of (IT)

(73) Assignee: OTC-Optical Technologies Center S.r.l., Turin (IT)

( * ) Notice: Subject to any disclaimer, the term of this patent is extended or adjusted under 35 U.S.C. 154(b) by 0 days.

(21) Appl. No.: 09/265,004

(22) Filed: Mar. 9, 1999

(30) Foreign Application Priority Data

Apr. 10, 1998 (IT) ................................ T098A0305

(51) Int. Cl.⁷ ................................................. G02B 6/34
(52) U.S. Cl. .............................. 385/37; 385/28; 385/123; 385/124
(58) Field of Search .................................. 385/37, 28, 12, 385/123, 127, 129, 142, 124; 372/6, 96, 45, 20; 250/559.48; 356/345

(56) References Cited

U.S. PATENT DOCUMENTS 5,066,133 * 11/1991 Brienza .................................. 385/37

FOREIGN PATENT DOCUMENTS 0 805 365  11/1997 (EP) .

03246510  11/1991 (JP) .

OTHER PUBLICATIONS

Fiber Gratings in Lasers and Amplifiers, Jean–Luc Archambault and Stephen G. Grubb, 1997, pp. 1378–1390.
Fiber Bragg Grating Technology Fundamentals and Overview, Kenneth O. Hill and Gerald Meltz, Aug. '97, pp. 1263–1276.
Lightwave Applicatiosn of Fiber Bragg Gratings, C. R. Giles, pp. 1391 to 1404, Aug. 8, 1997.
On the Use of Tapered Linearly Chirped Gratings . . . , Javier Martu et al, Feb. 1997, pp. 179 to 187.
Asymmetrically Apodised Linearly–Chirped Fibre Bragg . . . , XP–002107888, M.N. Zervas and D. Taverner, pp. 417, 418, Sep. 24, 1998.
Jap. Pat Laid–Open Application (1998) 133039.
Jap. Pat Laid–Open Application (1998) 90539.
Jap. Pat Laid–Open Application (1997) 304638.

* cited by examiner

*Primary Examiner*—Phan T.H. Palmer
(74) *Attorney, Agent, or Firm*—Herbert Dubno

(57) ABSTRACT

A grating made in the core of an optical fiber presents a nonuniform and asymmetrical profile of the modulation of the refractive index in the direction of the length, which profile is represented by a curve that rises gradually and monotonically from a minimum and substantially null value, with substantially horizontal tangent, in correspondence with an end of the grating to a maximum value, also with substantially horizontal tangent, which is reached in correspondence with the other end of the grating.

4 Claims, 1 Drawing Sheet

FIBRE BRAGG GRATING WITH OFFSET EQUIVALENT MIRROR PLANE AND METHOD FOR ITS MANUFACTURE

FIELD OF THE INVENTION

The present invention relates to optical fiber components for optical telecommunication systems, and more specifically to a fiber Bragg grating with offset equivalent mirror plane and to a method of manufacturing such gratings.

BACKGROUND OF THE INVENTION

The use of fiber Bragg gratings in components for optical telecommunication systems such as lasers, amplifiers, filters, add-drop multiplexers, wavelength multiplexers/demultiplexers, etc. has been known for some time. A review of the use of fiber Bragg gratings as components of optical telecommunication systems is found for instance in the papers "Lightwave Applications of Fiber Bragg Gratings", by C. R. Giles, Journal of Lightwave Technology, Vol. 15, No. 8, August 1997, pp. 1391 et seq., and "Fiber Gratings in Lasers and Amplifiers", by J. Archambault and S. G. Grubb, ibid., pp. 1379 et seq.

In particular, in applications in wavelength division multiplexing systems it is necessary to have devices capable of separating the various channels. For this purpose it is possible to use gratings of which the reflection spectrum presents a peak that is, insofar as possible, narrow and free of side lobes.

When fiber Bragg gratings are used to make one or both the reflecting elements that delimit a resonant cavity of a component, e.g. a Fabry-Perot cavity laser, to be used in such systems, one encounters problems linked to the cavity length. This length depends, as is well known, on the position of the so-called equivalent mirror plane of the grating. The equivalent mirror plane is the plane where a mirror would have to be positioned in order that a pulse sent by a source and reflected by the mirror returns to the source in the same time the pulse sent into the grating would take to return. The distance between the equivalent mirror plane and the input end of the grating constitutes the equivalent length of the grating. The length of a resonant cavity that makes use of fiber Bragg gratings is therefore represented by the distance between the equivalent mirror plane of the grating and the other reflecting element of the cavity (if only one such element is made by a grating) or between the equivalent mirror planes of the two gratings (if both reflecting elements are made by gratings). Now, if the linewidth of the laser is to be kept limited, the length of the cavity cannot be shorter than a certain minimum length, which is determined by manufacturing requirements; on the other hand, the longer the cavity, the shorter the distance between the modes and hence the harder the separation between the different modes.

The gratings proposed until now have a modulation of the refractive index which, as a function of the length of the grating, presents a symmetrical profile with respect to the central point of the grating. In these symmetrical gratings the equivalent mirror plane is placed substantially at the center of the grating, if the latter is a low-reflecting grating, and is located in a more advanced position towards one end if the grating is a highly reflecting grating. "Low-reflecting" indicates a value of reflectivity such that, when the grating is used as the reflecting element of the cavity, the radiation fraction exiting the cavity is sufficient for practical uses (typically, a reflectivity of the order of 70% in a laser); "highly reflecting" indicates a reflectivity of practically 100% or very close to this value. A highly reflecting grating could be used as one of the reflecting elements of the cavity, thereby reducing its length, provided the other reflecting element presents a sufficiently high transmission factor. In the case of a cavity with only one reflecting element made by a grating, the latter is positioned in correspondence with the output end and the use of a highly reflecting grating under such conditions is clearly inconceivable. In the case of a cavity where both reflecting elements are made by gratings (in the example, the cavity of an all-fiber laser), the use of a highly reflective grating does not solve the problem of obtaining a narrow band with a very reduced length of the cavity, both because the spectral line of those gratings is in any case relatively wide, and because one of the gratings should be a low-reflecting grating and hence would present a high equivalent length.

SUMMARY OF THE INVENTION

The aforesaid problems are solved by the grating according to the present invention, which presents both a narrow reflectivity spectrum, free of secondary lobes, and a reduced equivalent length.

More specifically, a grating is provided that presents a non uniform, asymmetrical profile of modulation of the refractive index in the direction of the length, which profile is represented by a curve that has a minimum and substantially zero value, with substantially horizontal tangent, in correspondence with one end of the grating, and rises gradually and monotonically until a maximum value, also with a substantially horizontal tangent, is reached in correspondence with the other end of the grating, where the curve returns to the minimum value with substantially vertical slope.

Preferably such a curve has a trend represented by one of the following functions:

$y = \exp(-x^2)$ (i.e. a Gaussian function), $y = \sin^2 x$, $y = \tanh x$.

An asymmetrical modulation profile like the one provided according to the invention effectively guarantees that the equivalent mirror plane is moved forward, in proximity with the maximum of the modulation profile of the refractive index, as is readily apparent when applying the description provided in L. A. Coldren, S. W. Corzine: "Diode Lasers and Photonic Integrated Circuits", Wiley & Sons, 1995. In a practical embodiment of the invention, in a grating with length of about 1 cm and reflectivity of the order of 70%, with a half-Gaussian modulation profile, the equivalent mirror plane was positioned about 2.5 mm from the end closer to the modulation maximum; by way of comparison, a conventional grating of the same length and similar reflectivity, with symmetrical Gaussian profile of the refractive index modulation, would have an equivalent length of the order of 5 mm, thus substantially double.

A grating such as the one described can therefore be advantageously employed with a resonant cavity, to form one or both the reflecting elements that delimit the cavity. Moreover, tests carried out have demonstrated that there are no secondary peaks and that the reflection band is narrow.

To make a grating such as the one described, the conventional techniques for writing gratings into optical fibers are used. A review of such techniques can be found in the paper "Fiber Bragg Grating Technology Fundamentals and Overview", Journal of Lightwave Technology, Vol. 15, No.

8, August 1997, pp. 1263 et seq. According to the invention, in order to obtain the refractive index modulation described above when writing the grating by using a phase mask, the diaphragm used to generate the intensity distribution of the writing radiation on the phase mask must be such as to create an asymmetrical distribution, corresponding to the desired profile of the refractive index modulation. Hence the diaphragm will be such as to intercept half the beam and to create, with reference to the exemplary functions mentioned above, a distribution corresponding to the part included between the minimum and the maximum of a Gaussian curve or of a curve of the type $\sin^2 x$, tanh x, etc.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
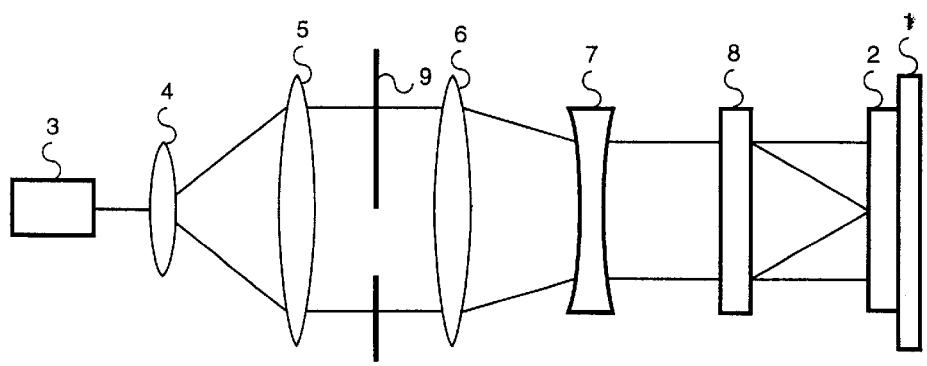
FIG. 1 schematically shows a device for the manufacture of an optical fiber grating.

FIG. 1 schematically shows a conventional device for writing Bragg gratings into an optical fiber 1 with the use of a phase mask 2. The phase mask 2 is illuminated by the UV radiation emitted by a laser 3 through an optical system capable of creating, in correspondence with the phase mask 2, an image of the source 3 comprising a thin strip whose length corresponds to that of the grating to be manufactured. The phase mask, as is well known, gives rise to interference, in correspondence with the fiber, to resulting in variations of the intensity of the writing radiation which in turn cause corresponding periodic variations of the refractive index of the core of the fiber in the irradiated area.

The optical system comprises, in a known manner: a first lens 4 expanding the beam emitted by the source; a group of lenses 5, 6, 7 generating a collimated beam; a cylindrical lens 8 forming the image of the source on the phase mask 2; a diaphragm 9, interposed between the lenses 5, 6, which shapes the beam and confers it an intensity distribution corresponding to the refractive index modulation profile to be induced in the core of the fiber 1 in the irradiated area.

Figure 2:
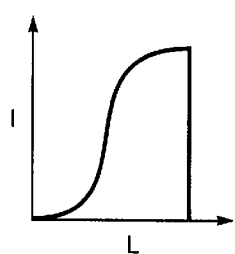
FIG. 2 is a intensity distribution of the writing beam required according to the invention.
Figure 3:
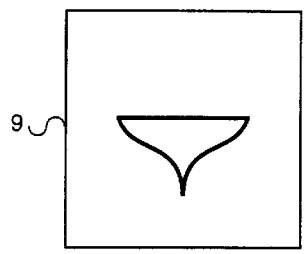
FIG. 3 is a front view of a diaphragm which is employed in order to obtain the intensity distribution of the writing beam shown in FIG. 2.

More specifically, the distribution profile of the intensity of the image formed by the cylindrical lens 8 must be asymmetrical and substantially zero, with horizontal tangent, in correspondence with one end of the image, and must gradually rise until reaching a maximum value, also with substantially horizontal tangent, in correspondence with the other end of the image, returning then to zero with substantially vertical slope. Therefore, the diaphragm 9 shall extend along the path of the beam in such a way as to intercept substantially half the beam itself. Intensity distribution profiles that meet the demands of the invention are for instance those corresponding to half of a Gaussian curve [$y=\exp(-x^2)$] or of a curve of the type $y=\sin^2 x$ or yet of a curve of the type $y=\tanh x$. A half-Gaussian intensity distribution is shown in FIG. 2. This distribution can be obtained with a diaphragm 9 like the one shown in FIG. 3.

Figure 4:
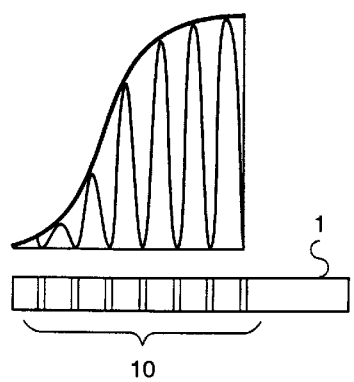
FIG. 4 shows the modulation profile of the refractive index of a grating according to the invention.

FIG. 4 shows a grating 10 and the modulation of the refractive index obtained with an intensity distribution of the writing radiation like the one shown in FIG. 2. For the sake of drawing clarity, the pitch of the grating has been exaggeratedly lengthened in FIG. 4.

Figure 5:
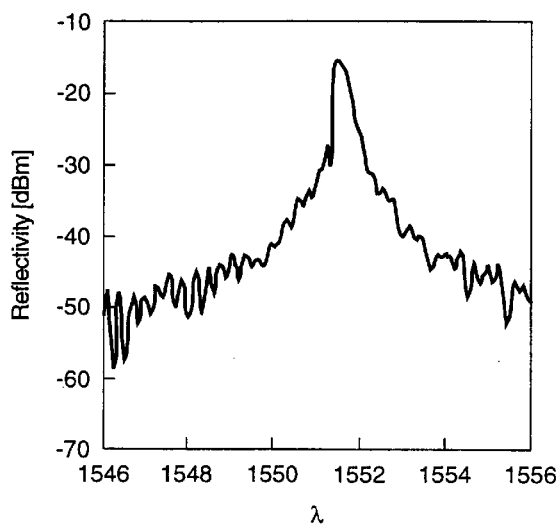
FIG. 5 shows the reflection spectrum of the grating of FIG. 4.

FIG. 5 shows the reflection spectrum of a grating like the one shown in FIG. 4. One can clearly see the single secondary lobe, which however has very reduced intensity with respect to the main peak and hence causes no problems for wavelength selection.

It is evident that the description above is provided purely by way of example and that variations and modifications are possible without departing from the scope of the invention. Thus, for instance, although reference has been made to an optical fiber, the invention can relate also to gratings obtained in integrated optical guides; also, for the manufacture, one can exploit, instead of a phase mask, the interference between two beams obtained by splitting the pulses emitted by a source between the two branches of an interferometer.

What is claimed is:

1. A Bragg grating written in a portion of the core of an optical fiber or waveguide wherein said grating presents, in a direction of a length therein, an asymmetrical modulation profile of the refractive index, which profile is represented by a curve having a substantially zero minimum value, with a substantially horizontal tangent, in correspondence with one end of the grating and rises gradually and monotonically to a maximum value, also with a substantially horizontal tangent, which is reached in correspondence the another end of the grating.

2. The grating according to claim 1 wherein said curve is chosen among the following curves:

$y=\exp(-x^2)$, $y=\sin^2 x$, $y=\tanh x$.

3. A method of manufacturing a Bragg grating, with an equivalent mirror plane offset towards an end of the grating, in an optical fiber or waveguide, wherein the fiber waveguide is exposed, in a portion where the grating is to be formed, to the action of a radiation with an intensity distribution giving rise to a modulation of the refractive index in the irradiated area, said intensity distribution being shaped to impart to said modulation an asymmetrical profile, represented by a curve that has substantially zero minimum value, with a substantially horizontal tangent, in correspondence with one end of the grating, and gradually and monotonically rising to a maximum value, also with a substantially horizontal tangent, which is reached in correspondence with another end of the grating.

4. The method according to claim 3 wherein said intensity distribution is obtained by means of a diaphragm capable of intercepting half the beam and so shaped that the modulation profile, in the portion with gradual variation, has a trend represented by a function selected from the following functions:

$y=\exp(-x^2)$, $y=\sin^2 x$, $y=\tanh x$.

* * * * *